United States Patent [19]

Fujii et al.

[11] 4,304,883
[45] Dec. 8, 1981

[54] UNSATURATED POLYESTER RESIN COMPOSITION FOR COATING METAL SUBSTRATES

[75] Inventors: Tadashi Fujii; Kazuyuki Tanaka; Tsutomu Toyoda; Hirobumi Izumi, all of Hitachi, Japan

[73] Assignee: Hitachi Chemical Company, Ltd., Tokyo, Japan

[21] Appl. No.: 169,302

[22] Filed: Jul. 16, 1980

[30] Foreign Application Priority Data

Jul. 19, 1979 [JP] Japan ................................. 54/92225

[51] Int. Cl.$^3$ ...................... C08G 63/46; C08L 67/06
[52] U.S. Cl. .................... 525/170; 525/445; 528/297; 528/298; 428/458
[58] Field of Search ................ 525/170, 445; 528/297, 528/298; 260/22 CB

[56] References Cited

U.S. PATENT DOCUMENTS 3,644,568  2/1972  Tilley et al. ..................... 525/445 X
3,660,371  5/1972  Johnson et al. ................. 525/170 X
3,883,612  5/1975  Pratt et al. ........................ 525/170

FOREIGN PATENT DOCUMENTS 987713  3/1965  United Kingdom .

Primary Examiner—Earl A. Nielsen
Attorney, Agent, or Firm—Gordon W. Hueschen

[57] ABSTRACT

An unsaturated polyester resin composition for coating metal substrates, comprising an unsaturated alkyd component and a polymerizable vinyl monomer, said unsaturated alkyd component selected from the group consisting of:

(a) compounds resulting from addition of monoepoxy compounds possessing a $\beta,\gamma$-unsaturated ether to the carboxyl group of dicyclopentadiene-modified unsaturated alkyds, and (b) mixtures of dicyclopentadiene-modified unsaturated alkyds with unsaturated alkyds obtained by the ring-opening copolymerization of $\alpha,\beta$-unsaturated dicarboxylic anhydrides and monoepoxy compounds possessing a $\beta$, $\gamma$-unsaturated ether group.

19 Claims, No Drawings

UNSATURATED POLYESTER RESIN COMPOSITION FOR COATING METAL SUBSTRATES

BACKGROUND OF THE INVENTION

Field of the Invention

1. This invention relates to unsaturated polyester resin compositions used for coating metal substrates and to a method for the manufacture thereof. More particularly, the invention relates to unsaturated polyester resin compositions excellent in fast adhesiveness to metals and in air drying property and therefore, suitable for coating metal substrates such as steel plates and tin plates, and to a method for the manufacture thereof.

2. Description of the Prior Art

Generally, the unsaturated polyester resin is prepared by causing an unsaturated polyester, the product of the dehydration condensation reaction between an acid moiety comprising an $\alpha,\beta$-unsaturated dibasic acid such as fumaric acid, maleic anhydride or itaconic acid and a saturated dibasic acid such as phthalic acid, phthalic anhydride, isophthalic acid or adipic acid and an alcohol moiety such as ethylene glycol, diethylene glycol, propylene glycol or dipropylene glycol, to be dissolved in a polymerizable vinyl monomer such as styrene, vinyl toluene or diallyl phthalate which serves as the crosslinking agent in the reaction. It is polymerized and cured by using, as the polymerization catalyst, an organic peroxide such as benzoyl peroxide or methylethylketone peroxide and optionally using, as the polymerization accelerator, an organic metal salt such as cobalt octenate or cobalt naphthenate. In the unsaturated polyester resin thus produced, while the inner portion of the resin is cured rapidly, the surface portion of the resin exposed to the ambient air long retains its viscousness owing to the polymerization inhibiting activity exhibited by the oxygen in the air and, therefore, is devoid of air drying property and of intimate adhesiveness to metals.

For the purpose of overcoming such various drawbacks suffered by the conventional unsaturated polyester resins, there has been proposed an air-drying unsaturated polyester resin composition excelling in adhesiveness to metals, which is obtained by interesterifying at least one drying oil, semi-drying oil or nondrying oil with a polyhydric alcohol, causing the product of this interesterification to react with a polyhydric alcohol, an unsaturated polybasic acid or a mixture of an unsaturated polybasic acid with a saturated polybasic acid and dicyclopentadiene to synthesize a dicyclopentadiene-type oil-modified unsaturated polyester having an oil length of not more than 30% and dissolving the modified unsaturated polyester in a vinyl group containing compound (Japanese Patent Publication No. 15547/1961). Although this dicyclopentadiene-type oil-modified unsaturated polyester resin composition excels in fast adhesiveness to metals, it has a disadvantage in that it lacks ample air-drying property and, when applied to metal substrates, tends to collect dirt and betray poor workability.

On the other hand, as unsaturated polyester resin compositions excel in air-drying property, there have been proposed unsaturated polyester resin compositions modified with allyl ethers such as trimethylol propane diallyl ether, glycerine diallyl ether and pentaerythritol triallyl ether. Despite their excellent air-drying property, these allyl ether-modified unsaturated polyester resin compositions are still devoid of fast adhesiveness to metals. For this reason, they have been hardly accepted for the purpose of coating metal substrates.

The unsaturated polyester resins produces good results in the coating of metal substrates because of their salient merit that they can be applied in greater thicknesses to substrates than those coating compositions obtained by admixing alkyd resins, acrylic resins, etc., to diluting solvents. For this reason, debut of an unsaturated polyester resin composition which dries fast in air and excels in fast adhesiveness to metals is longed for.

An object of this invention, therefore, is to provide a novel unsaturated polyester resin composition for coating metal substrates and a method for the manufacture thereof.

Another object of this invention is to provide an air-drying unsaturated polyester resin composition which is excellent in fast adhesiveness to metals and in air drying property and, therefore, is useful for the coating of metal substrates and to a method for the manufacture thereof.

SUMMARY OF THE INVENTION

The objects described above are accomplished by the invention providing a metal-coating unsaturated polyester resin composition which comprises an unsaturated alkyd component and a polymerizable vinyl monomer, in which the unsaturated alkyd component selected from the group comprising (a) compounds obtained by addition of mono-epoxy compounds possessing a $\beta,\gamma$-unsaturated ether group to the carboxyl group of dicyclopentadiene-modified unsaturated alkyds and (b) mixtures of dicyclopentadiene-modified unsaturated alkyds with unsaturated alkyds obtained by the ring-opening copolymerization of $\alpha,\beta$-unsaturated dicarboxylic anhydrides with mono-epoxy compounds possessing a $\beta,\gamma$-unsaturated ether group.

PREFERRED EMBODIMENT OF THE INVENTION

The dicyclopentadiene-modified unsaturated alkyd used in this invention is obtained by subjecting a dicarboxylic acid component composed of an $\alpha,\beta$-unsaturated dicarboxylic acid or anhydride and a saturated dicarboxylic acid or anhydride (providing that the unsaturated dicarboxylic acid accounts for 10 to 100 mol% of the acid component), a polyhydric alcohol component, dicyclopentadiene or a derivative thereof in an amount corresponding to 5 to 60% by weight based on the total weight of said acid component and the alcohol component, optionally in the presence of a drying oil, semi-drying oil or a fatty acid thereof, to a dehydration condensation reaction under the atmosphere of an inert gas such as carbon dioxide gas or nitrogen gas, desirably at elevated temperatures within the range of 100° to 230° C. The acid number of the alkyd thus produced falls within the range of 30 to 70, preferably 90 to 140.

Concrete examples of the $\alpha,\beta$-unsaturated dicarboxylic acid and anhydride thereof usable herein include maleic acid, maleic anhydride, fumaric acid and itaconic acid. Examples of the saturated dicarboxylic acid and anhydride thereof usable herein include phthalic anhydride, isophthalic acid, terephthalic acid, tetrahydrophthalic anhydride, hexahydrophthalic anhydride, tetrachlorophthalic anhydride, Himic anhydride (trademark designation for 3,6-endomethylene-tetrahydrophthalic anhydride produced by Hitachi Chemical Company, Ltd.), succinic acid, adipic acid and sebacic acid. Examples of the polyhydric alcohol usable herein include ethylene glycol, diethylene glycol, triethylene glycol, propylene glycol, dipropylene glycol, butanediol-1,3, butanediol-1,4, butanediol-2,3, neopentyl glycol, pentanediol-1,5, hexanediol-1,6, 2,2,4-trimethyl pentanediol-1,3, hydrogenated Bisphenol A, glycerol, trimethylolethane and trimethylolpropane.

Examples of the dicyclopentadiene and derivatives thereof usable herein include dicyclopentadiene, hydroxylated, dicyclopentadiene and tricyclodecane dimethylol. The dicyclopentadiene or the derivative thereof is used in an amount of 5 to 60% by weight, preferably 20 to 40% by weight, based on the total weight of the aforementioned acid moiety and the alcohol moiety. Examples of drying oil, semi-drying oil and fatty acid thereof usable herein include linseed oil, soybean oil, cottonseed oil, safflower oil, rapeseed oil, tung oil, castor oil, corn oil, peanut oil and coconut oil. This oil is used in an amount of 0 to 20% by weight, preferably 0 to 10% by weight, based on the total weight of the acid moiety and the alcohol moiety.

The unsaturated alkyd (a) to be used in the present invention is prepared by causing the aforementioned dicyclopentadiene-modified unsaturated alkyd to be reacted upon by a mono-epoxy compound possessing a $\beta,\gamma$-unsaturated ether group in the presence of a basic catalyst under the atmosphere of an inert gas such as carbon dioxide gas or nitrogen gas desirably at elevated temperatures within the range of 80° to 150° C., preferably 100° to 130° C. thereby effecting addition of the aforementioned mono-epoxy compound to the carboxyl group remaining in the dicyclopentadiene-modified unsaturated alkyd. The acid number of the produced unsaturated alkyd falls desirably within the range of 10 to 60, preferably 20 to 35. If, during the reaction, the dicyclopentadiene-modified unsaturated alkyd has too high a viscosity to permit smooth stirring of the reaction system, then the viscosity may be lowered suitably by addition of a solvent such as benzene, toluene or xylene to facilitate the reaction.

The mono-epoxy compound possessing a $\beta,\gamma$-unsaturated ether group, for example, is a compound of the general formula:

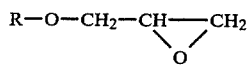

wherein R denotes a hydrocarbon group containing a $\beta,\gamma$-unsaturated group and optionally containing 0. Concrete examples of the compound usable herein include allyl-glycidyl ether, ethylene glycol monoallylmonoglycidyl ether, diethylene glycol-monoallylmonoglycidyl ether, glycerol diallyl-monoglycidyl ether and trimethylolpropane diallyl-monoglycidyl ether. This mono-epoxy compound is used in an amount equalling or approximating its own stoichiometric amount relative to the carboxyl group remaining in the dicyclopentadiene-modified unsaturated alkyd. Examples of the basic catalyst usable herein include alcoholates of alkali metals or alkaline earth metals such as sodium methoxide, potassium methoxide, sodium ethoxide, potassium ethoxide and magnesium methoxide, organic acid salts of alkali metals or alkaline earth metals such as potassium phthalate, sodium phthalate, potassium terephthalate, sodium cinnamate, potassium benzoate, sodium benzoate, and potassium phthalate, and quaternary ammonium salts such as trimethylbenzyl ammonium chloride. The catalyst is used in an amount desirably within the range of 0.001 to 0.1% by weight preferably 0.01 to 0.03% by weight, based on the total weight of the reactants.

The unsaturated alkyd (b) to be used in this invention is a mixture of the aforementioned dicyclopentadiene-modified unsaturated alkyd with an unsaturated alkyd which is obtained by the ring-opening copolymerization of an $\alpha,\beta$-unsaturated dicarboxylic anhydride with a mono-epoxy compound possessing a $\beta,\gamma$-unsaturated ether group.

The unsaturated alkyd to be mixed with the aforementioned dicyclopentadiene-modified unsaturated alkyd is obtained by subjecting an $\alpha,\beta$-unsaturated dicarboxylic anhydride and a mono-epoxy compound possessing a $\beta,\gamma$-unsaturated ether group to a ring-opening copolymerization in the presence of the aforementioned basic catalyst in an amount desirably within the range of 0.001 to 0.1% by weight, preferably 0.01 to 0.03% by weight, based of the total wight of the reactants under the atmosphere of an inert gas desirably at elevated temperatures within the range of 80° to 150° C., preferably 90° to 130° C. The basic catalyst is as already described.

Examples of the $\alpha,\beta$-unsaturated dicarboxylic anhydride usable herein include maleic anhydride and citraconic anhydride, the former being preferable to the latter. The compound possessing a $\beta,\gamma$-unsaturated ether group is as already described. The reaction of the compound possessing the $\alpha,\beta$-unsaturated ether group and the $\alpha,\beta$-unsaturated carboxylic anhydride is desired to be carried out, with the former in an amount of 50 to 60 mol% and the latter in an amount of 40 to 50 mol% respectively. The acid number of the unsaturated alkyd thus obtained desirably falls within the range of 13 to 95, preferably 20 to 35. This unsaturated alkyd is mixed with the aforementioned dicyclopentadiene-modified unsaturated alkyd desirably in an amount of 5 to 50% by weight, preferably 25 to 40% by weight, based on the latter alkyd. This mixing results in the formation of the unsaturated alkyd (b).

The unsaturated polyester resin composition is obtained by dissolving the aforementioned unsaturated alkyd (a) or (b) in the polymeric vinyl monomer and then adding to the resultant mixture a polymerization inhibitor in an amount desirably falling within the range of 0.001 to 0.1% by weight, preferably 0.01 to 0.05% by weight, based on the total weight of the aforementioned unsaturated alkyd and the aforementioned vinyl monomer.

Examples of the polymerization inhibitor usable herein include p-benzoquinone, hydroquinone, p-t-butyl catechol, mono-t-butyl hydroquinone and di-t-butyl-4-methyl phenol. Examples of the polymerizable vinyl monomer usable herein include styrene, vinyl toluene, chlorostyrene, $\alpha$-methyl styrene, methyl methacrylate, methyl acrylate, ethyl acrylate, vinyl acetate, diallyl phthalate, triallyl cyanurate and t-butyl styrene. The polymerizable vinyl monomer is used in an amount within the range of 20 to 100 parts by weight, preferably 40 to 60 parts by weight, based on 100 parts by weight of the unsaturated alkyd (a) or (b).

The unsaturated polyester resin composition according to this invention is set by using, as the curing agent, an organic peroxide selected from the group consisting of benzoyl peroxide, methylethylketone peroxide, cyclohexanone peroxide, cumene hydroperoxide, acetylacetone peroxide, lauroyl peroxide and t-butyl hydroperoxide, in an amount desirably within the range of 0.1 to 5% by weight, preferably 1 to 2% by weight, based on the weight of the composition. Optionally, one or more members selected from the group consisting of naphthenates, octenates and other metal soaps including, for example, cobalt naphthenate, cobalt octenate, manganese naphthenate, copper naphthenate, zinc naphthenate, zirconium naphthenate and lead naphthenate, may be used as the promoter and dimethyl aniline, diethyl aniline, acetyl acetone or dimethyl acetamide may be used as the aid to the promoter.

Optionally, the unsaturated polyester resin composition of the present invention may incorporate, to suit the intended use, an inorganic filler such as calcium carbonate, magnesium carbonate, calcium sulfate, alumina, clay, talc, silica, diatomaceous earth or mica powder, an ultraviolet ray absorbent such as phenyl salicylate, 1-(2'-hydroxy-5-methylphenyl)-benzotriazole, 2-hydroxy-4-methoxy-benzophenone or 2,2'-dihydroxy-4-methoxy-benzophenone, a thermoplastic resin such as polystyrene, polyethylene, polyvinyl acetate, polymethyl methacrylate or saturated polyester, a dye or a pigment.

Again optionally, the resin composition of this invention may be set under a light source such as, for example, a mercury vapor lamp, a tungsten lamp or a xenon lamp in the presence of an ultraviolet ray curing agent such as, for example, benzoin, benzoin methyl ether, benzoin ethyl ether, benzoin isopropyl ether, diphenyl disulfide, di-β-naphthyl sulfide, 4,4'-dimethyl disulfide or 2,2',4,4'-tetrachloro-disulfide which is added in an amount within the range of 0.5 to 5% by weight based on the weight of the resin composition.

The unsaturated polyester resin composition of the present invention forms a coat of excellent adhesiveness on the surface of a metal substrate such as steel plate or tin plate when it is applied to the metal substrate by the technique of spray coating, electrostatic coating, brush coating, flow coater coating or roll coating and then left to set under the atmosphere of air at a varying temperature to be selected depending on the kind of the catalyst in use, generally within the range of 5° to 150° C.

EXAMPLE 1

Under a current of nitrogen gas 69 g of maleic anhydride, 44 g of phthalic anhydride, 106 g of diethylene glycol and 52 g of dicyclopentadiene were subjected to a dehydration condensation reaction at temperatures within the range of 170° to 210° C. to produce a dicyclopentadiene-modified unsaturated alkyd having an acid number of 103, which was subsequently cooled to 110° C. This unsaturated alkyd was allowed to react with 53 g of allyl glycidyl ether and 0.03 g of trimethylbenzyl ammonium chloride at temperatures within the range of 110° to 130° C., to produce a dicyclopentadiene-modified unsaturated alkyd modified with glycidyl ether and having an acid number of 25. A resin composition A, was prepared by adding 0.03 g of hydroquinone and then 130 g of styrene to this modified alkyd.

The resin composition A, with 0.5% by weight of cobalt naphthenate (having a metal content of 6% by weight) and 1.0% by weight of Permek N (trademark designation for 55% by weight methylethyl ketone peroxide produced by Nippon Oil and Fat Co., Ltd.) added thereto, was applied with a brush at a rate of 20 g/30 cm × 30 cm to a tin plate 0.25 mm thick polished in advance with waterproof sand paper, #150 and then was set for drying at 25° C. The results obtained of the coat thus formed are shown in Table 1.

EXAMPLE 2

Under a current of nitrogen gas, 78 g of maleic anhydride, 29 g of adipic acid, 50 g of ethylene glycol and 62 g of hydroxylated dicyclopentadiene were subjected to a hydration condensation reaction at temperatures within the range of 170° to 210° C., to produce a dicyclopentadiene-modified unsaturated alkyd having an acid number of 140, which was subsequently cooled to 100° C. Then this dicyclopentadiene-modified unsaturated alkyd was allowed to react with 60 g of allyl glycidyl ether and 0.05 g of potassium benzoate at temperatures within the range of 100° to 120° C. to produce an unsaturated alkyd having an acid number of 34. A resin composition B, was prepared by adding 0.03 g of hydroquinone to the unsaturated alkyd and dissolving it by addition of 107 g of styrene.

By following the procedure of EXAMPLE 1, the resin composition B similarly incorporating the promoter and curing agent was applied to coat the tin plate test specimen. The results are shown in Table 1.

CONTROL 1

Under a current of nitrogen gas, 70 g of fumaric acid, 50 g of phthalic anhydride, 38 g of propylene glycol and 64 g of diethylene glycol were subjected to a dehydration condensation reaction at temperatures within the range of 190° to 210° C., to produce an unsaturated alkyd having an acid number of 120, which was subsequently cooled to 90° C. This unsaturated alkyd was allowed to react with 66 g of ethylene glycol monoallyl monoglycidyl ether and 0.05 g of potassium benzoate at temperatures within the range of 120° to 140° C., to produce an unsaturated alkyd having an acid number of 29. A resin composition C, was prepared by adding 0.03 g of hydroquinone to the unsaturated alkyd and dissolving it by addition of 111 g of styrene.

By following the procedure of EXAMPLE 1, the resin composition C similarly incorporating 0.5% by weight of cobalt octenate (having a metal content of 6% by weight) and 1% by weight of Permek N was applied to coat the tin plate specimen. The results are shown in Table 1.

CONTROL 2

Under a current of nitrogen gas, 49 g of maleic anhydride, 74 g of phthalic anhydride and 84 g of propylene glycol were subjected to a hydration condensation reaction at temperatures within the range of 190° to 220° C. to produce an unsaturated alkyd having an acid number of 31. A resin composition D, was prepared by dissolving this unsaturated alkyd by addition of 0.02 g of hydroquinone and 80 g of styrene.

By following the procedure of EXAMPLE 1, the resin composition D similarly incorporating the promoter and the curing agent was applied to coat the tin plate test specimen. The results are shown in Table 1.

CONTROL 3

Under a current of nitrogen gas, 90 g of maleic anhydride, 15 g of phthalic anhydride, 62 g of ethylene glycol, 35 g of soybean oil fatty acid monoglyceride and 52 g of dicyclopentadiene were subjected to a dehydration condensation reaction at temperatures within the range of 190° to 210° C., to produce an unsaturated alkyd having an acid number of 39. A resin composition E, was prepared by dissolving this unsaturated alkyd by addition of 0.04 g of hydroquinone and 107 g styrene.

By following the procedure of EXAMPLE 1, the resin composition E similarly incorporating the promoter and the curing agent was applied to coat the tin plate test specimen. The results are shown in Table 1.

CONTROL 4

Under a current of nitrogen gas, 98 g of maleic anhydride, 114 g of allyl glycidyl ether and 0.02 g of triethylbenzyl ammonium chloride were subjected to a reaction at temperatures within the range of 80° to 110° C., to afford an unsaturated alkyd having an acid number of 35. A resin composition F, was prepared by dissolving this unsaturated alkyd by addition of 0.03 g of p-benzoquinone and 91 g styrene.

When the resin composition F was applied to coat the tin plate test specimen under the same conditions as those of EXAMPLE 1, the coat formed was rigid and brittle despite its excellent air drying property. The results obtained of this resin composition are shown in Table 1.

EXAMPLE 3

A resin composition G, was prepared by adding 30% by weight of the resin composition F to the resin composition E. By following the procedure of EXAMPLE 1, the resin composition G similarly incorporating the promoter and the curing agent was applied to coat the tin plate test specimen. The results are shown in Table 1.

CONTROL 5

Under a current of nitrogen gas, 98 g of maleic anhydride, 55 g, of propylene glycol, 21 g of diethylene glycol and 51 g of glycerol diallyl ether were subjected to a dehydration condensation reaction at temperatures within the range of 160° to 200° C., to produce an unsaturated alkyd having an acid number of 29. A resin composition H, was prepared by dissolving the unsaturated alkyd by addition of 0.04 g of hydroquinone and 88 g of styrene.

By following the procedure of EXAMPLE 1, the resin composition H was applied to coat the tin plate test specimen. The results are shown in Table 1.

The unsaturated polyester resin compositions according to this invention have short finger-touch drying time and surface drying time and enjoy excellent adhesiveness to metal substrates. Because of these features, they are extensively applicable to the coating of electric appliances, automobile parts and household furniture articles.

What is claimed is:

1. An unsaturated polyester resin composition for coating metal substrates, comprising an unsaturated alkyd component and a polymerizable vinyl monomer, said unsaturated alkyd component selected from the group consisting of:
   (a) compounds resulting from addition of mono-epoxy compounds possessing a $\beta,\gamma$-unsaturated ether to the carboxyl group of dicyclopentadiene-modified unsaturated alkyds, and (b) mixtures of dicyclopentadiene-modified unsaturated alkyds with unsaturated alkyds obtained by the ring-opening copolymerization of $\alpha,\beta$-unsaturated dicarboxylic anhydrides and mono-epoxy compounds possessing a $\beta,\gamma$-unsaturated ether group.

2. A composition according to claim 1, wherein the mono-epoxy compound possessing a $\beta,\gamma$-unsaturated ether group is represented by the following general formula:

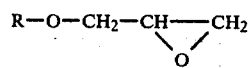

wherein R, denotes a hydrocarbon group possessing a $\beta,\gamma$-unsaturated group and optionally including O.

3. A composition according to claim 2, wherein the mono-epoxy compound possessing a $\beta,\gamma$-unsaturated ether group is allyl glycidyl ether.

4. A composition according to claim 1, wherein the polymerizable vinyl monomer is used in an amount within the range of 20 to 100 parts by weight based on 100 parts by weight of the unsaturated alkyd component.

5. A composition according to claim 1, wherein the unsaturated alkyd composition is a compound resulting from the addition of a mono-epoxy compound possessing a $\beta,\gamma$-unsaturated ether group to the carboxy group of the dicyclopentadiene-modified unsaturated alkyd (a).

6. A composition according to claim 5, wherein the mono-epoxy compound possessing a $\beta,\gamma$-unsaturated

TABLE 1

| Item | Resin composition | | | | | | | |
|---|---|---|---|---|---|---|---|---|
| | A | B | C | D | E | F | G | H |
| (1) Drying time by touch of finger (in minutes) | 30 | 25 | 52 | Failed to dry and unavailable for test | 60 | 15 | 20 | 25 |
| (2) Surface drying time (in minutes) | 80 | 60 | 147 | | 195 | 40 | 70 | 50 |
| (3) Surface pencil hardness* | F | B~F | F | | HB-F2 | H | H | F |
| (4) Adhesiveness to tin Plate** | o | o | Δ | x | o | o*** | o | x |

Tests (1) through (3) were conducted in accordance with Japanese Industrial Standard K 5400.
*The pencil hardnes was performed 24 hours after the coat application, using a "Mitsubishi Uni" pencil.
**The adhesiveness was rated by subjecting the test specimen to a bending test 24 hours after the coat application, and visually evaluating the condition of the resin's adhesion to the test specimen. The rating was made on the three-point scale, wherein o denotes thorough adhesion, Δ about 50% adhesion and x absence of adhesion.
***Brittleness showed.

ether group is added in an amount approximating its stoichiometric amount relative to the carboxy group remaining in the dicyclopentadiene-modified unsaturated alkyd.

7. A composition according to claim 6, wherein the unsaturated alkyd component (a) has an acid number within the range of 10 to 60.

8. A composition according to claim 1, wherein the unsaturated alkyd component is a mixture of the dicyclopentadiene-modified unsaturated alkyd (b) and an unsaturated alkyd obtained by the ring-opening copolymerization of an α,β-unsaturated dicarboxylic anhydride and a mono-epoxy compound possessing a β,γ-unsaturated ether group.

9. A composition according to claim 8, wherein the α,β-unsaturated dicarboxylic anhydride accounts for 50 to 40 mol% and the compound possessing a β,γ-unsaturated ether group for 50 to 60 mol%.

10. A composition according to claim 9, wherein the unsaturated alkyd obtained by the ring-opening copolymerization of the α,β-unsaturated dicarboxylic anhydride and the mono-epoxy compound possessing a β,γ-unsaturated ether group has an acid number within the range of 13 to 95.

11. A composition according to claim 10, wherein the unsaturated alkyd obtained by the ring-opening copolymerization of the α,β-unsaturated dicarboxylic anhydride and the mono-epoxy compound possessing a β,γ-unsaturated ether group has an acid number within the range of 5 to 50.

12. A method for the manufacture of an unsaturated polyester resin composition for coating metal substrates, comprising the steps of causing a dicyclopentadiene-modified unsaturated alkyd to react with a mono-epoxy compound possessing a β,γ-unsaturated other group in the presence of a basic catalyst at temperatures within the range of 80° to 150° C. and mixing the resultant reaction product with a polymerizable vinyl monomer.

13. A method according to claim 12, wherein the mono-epoxy compound possessing a β,γ-unsaturated ether group is represented by the following general formula:

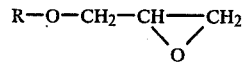

wherein, R denotes a hydrocarbon group possessing a β,γ-unsaturated group and optionally including O.

14. A method according to claim 13, wherein the mono-epoxy compound possessing a β,γ-unsaturated ether group is allyl glycidyl ether.

15. A method for the manufacture of an unsaturated polyester resin composition for coating metal substrates, which comprises the steps of subjecting an α,β-unsaturated dicarboxylic anhydride and a mono-epoxy compound possessing a β,γ-unsaturated ether group to a ring-opening copolymerization at temperatures within the range of 80° to 150° C., mixing the resultant unsaturated alkyd with a dicyclopentadiene-modified unsaturated alkyd, and mixing the resultant mixed unsaturated alkyd component with a polymerizable vinyl monomer.

16. A method according to claim 15, wherein the mono-epoxy compound possessing a β,γ-unsaturated ether group is represented by the following general formula:

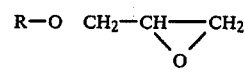

wherein R, denotes a hydrocarbon group possessing a β,γ-unsaturated group and optionally including O.

17. A method according to claim 16, wherein the mono-epoxy compound possessing a β,γ-unsaturated ether group is allyl glycidyl ether.

18. A method according to claim 15, wherein the mono-epoxy compound possessing a β,γ-unsaturated ether group accounts for 50 to 60 mol% and the α,β-unsaturated dicarboxylic anhydride for 50 to 40 mol%.

19. A method according to claim 15, wherein the unsaturated alkyd obtained by the ring-opening copolymerization of the α,β-unsaturated dicarboxylic anhydride and the mono-epoxy compound possessing a β,γ-unsaturated ether group is mixed with amount within the range of 5 to 50 percent by weight based on the weight of the dicyclopentadiene-modified unsaturated alkyd.

* * * * *

UNITED STATES PATENT AND TRADEMARK OFFICE
CERTIFICATE OF CORRECTION

PATENT NO. : 4,304,883
DATED : December 8, 1981
INVENTOR(S) : Tadashi Fujii, Kazuyuki Tanaka, Tsutomu Toyoda and Hirobumi Izumi It is certified that error appears in the above—identified patent and that said Letters Patent is hereby corrected as shown below:

On the title page
[56] References Cited, FOREIGN PATENT DOCUMENTS: after "United Kingdom ." insert -- Chemischi Werke Witten --.

Col. 2, line 58; "70" should read -- 170 --
Col. 7, TABLE 1, item "(3)", column "E"; "HB-F2" should read -- HB-F --
Col. 7, TABLE 1, item "(3)" column "F"; "H" should read -- 2H --

Signed and Sealed this

Twenty-fifth Day of May 1982

[SEAL]

Attest:

GERALD J. MOSSINGHOFF

*Attesting Officer*  *Commissioner of Patents and Trademarks*